United States Patent
Slaby

[15] 3,672,641
[45] June 27, 1972

[54] APPARATUS FOR REMOVING LIQUIDS FROM ELASTOMERIC POLYMERS

[72] Inventor: Robert Kent Slaby, Piqua, Ohio

[73] Assignee: The French Oil Mill Machinery Company, Piqua, Ohio

[22] Filed: Sept. 14, 1970

[21] Appl. No.: 71,639

Related U.S. Application Data

[63] Continuation-in-part of Ser. No. 753,647, Aug. 19, 1968, Pat. No. 3,574,891.

[52] U.S. Cl. .................................................259/9, 18/12 SB
[51] Int. Cl. ..........................................................B01f 7/08
[58] Field of Search ........................259/9, 10, 25, 26, 45, 46; 18/12 R, 12 SB, 12 SC

[56] References Cited

UNITED STATES PATENTS

| | | | |
|---|---|---|---|
| 3,023,455 | 3/1962 | Geier | 259/9 |
| 3,382,538 | 5/1968 | Burner | 18/12 SB |
| 3,505,085 | 4/1970 | Straughn | 259/9 |
| 3,601,370 | 8/1971 | Ruettener | 259/9 |

Primary Examiner—Robert W. Jenkins
Attorney—Marechal, Biebel, French & Bugg

[57] ABSTRACT

A continuous process and apparatus for removing liquids and/or vapors from elastomeric polymers causes the liquid containing polymer to undergo mechanical working and then a substantial reduction in pressure while contained within a chamber having small vents to atmosphere or a collection housing. Essentially all of the last traces of liquids or vapors are removed in this chamber, the material is cooled by the vaporization of contained liquids, any resulting fine particles are contained and immediately mixed into the material, and the material is subsequently discharged through an extruder section without further significant creating of fine particles in the end product as discharged.

5 Claims, 5 Drawing Figures

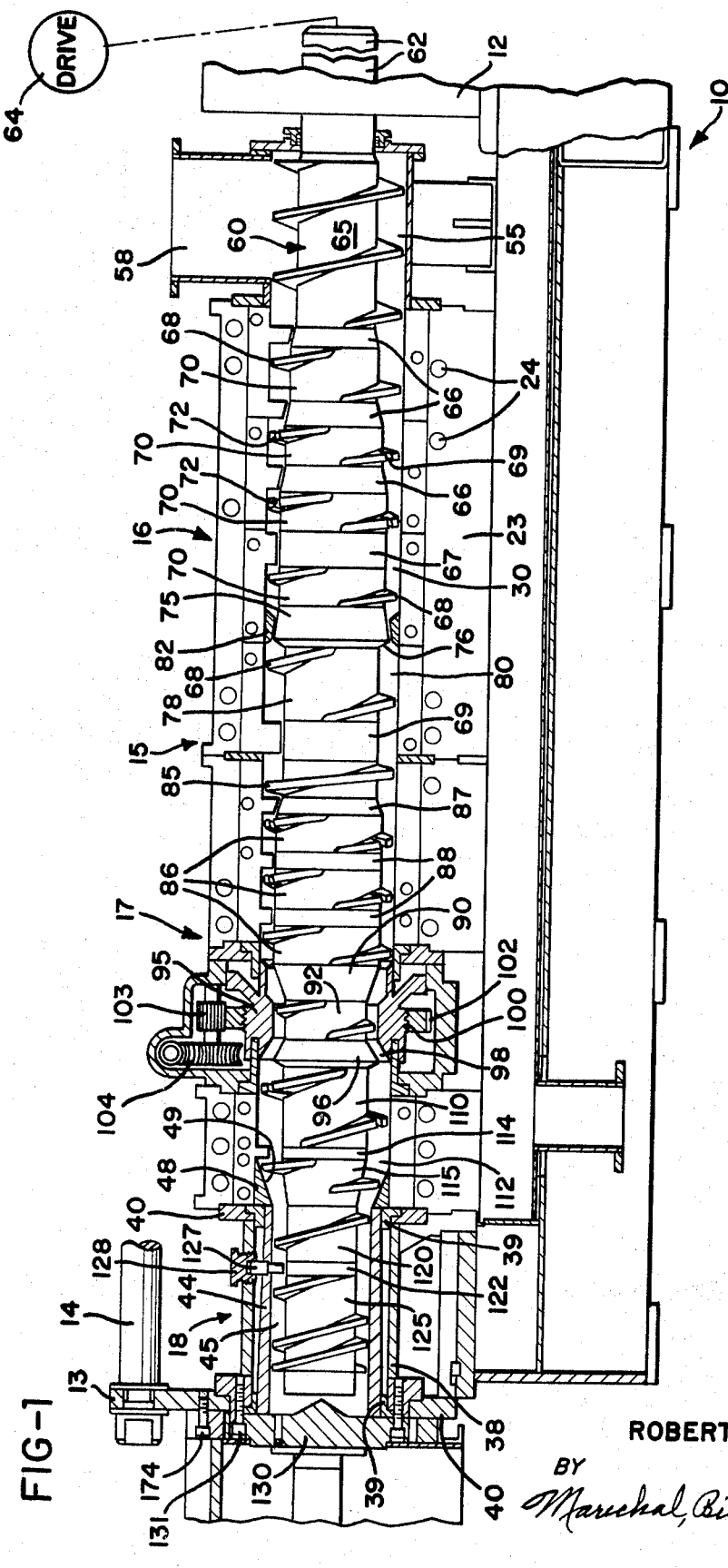

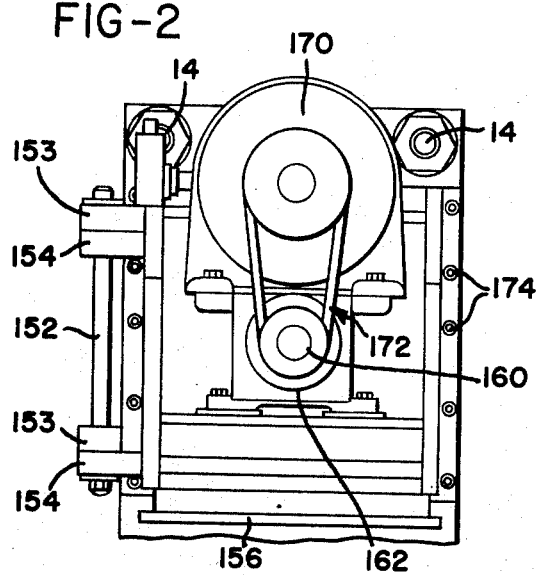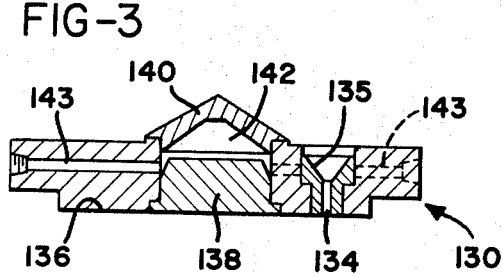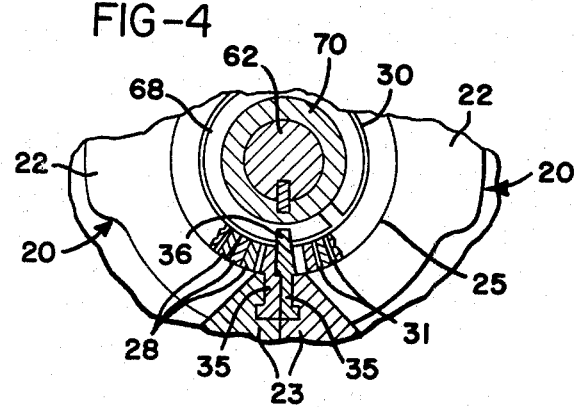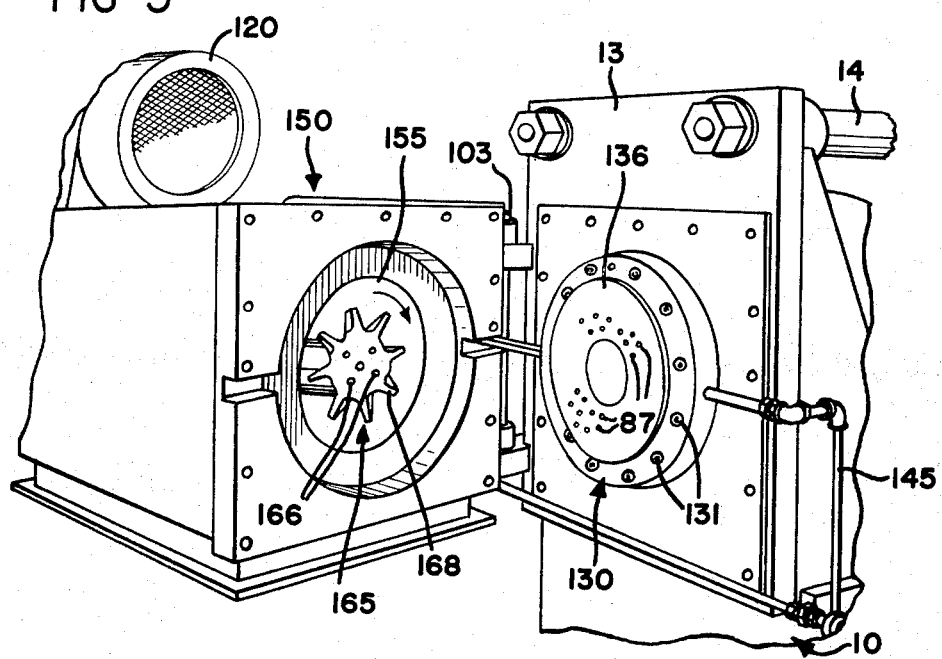

APPARATUS FOR REMOVING LIQUIDS FROM ELASTOMERIC POLYMERS

CROSS REFERENCE TO RELATED APPLICATION

This application is a continuation-in-part of copending U.S. Pat. application, Ser. No. 753,647 filed Aug. 19, 1968 now Pat. No. 3,574,891, and assigned to the assignee of this application.

BACKGROUND OF THE INVENTION

The invention relates generally to a method and apparatus for the removal of liquids, water, various hydrocarbons, etc., both in liquid and vapor phase, from elastomeric polymeric material. In the context of the present description, such materials as natural and synthetic polymers, some of which may include water or other liquids in their natural state, or as the result of production processes for the manufacture of synthetic polymeric materials, are the types of materials from which liquid or vapor is removed. The apparatus provided by the invention is generally classified as a continuous mechanical screw press, capable of continuous, as distinguished from batch type, operation on the polymeric materials to remove essentially all traces of moisture from the material, preferably forming a pellet-like porous product, which is suitable for baling, packaging, or further processing into product form.

Typical prior art devices of this type for removing moisture from elastomeric polymers are shown in U.S. Pat. No. 3,225,453, issued Dec. 28, 1965 and U.S. Pat. No. 3,382,538, issued May 14, 1968. Both of these patents are assigned to the assignee of this application. A further improvement in such devices is disclosed in U.S. Pat. No. 3,518,936, issued July 7, 1970, which discloses an adjustable mid-press annular choke member, particularly useful in controlling the location within the press where liquid and/or vapor are removed from the material, in order to optimize such removal of liquid and vapors. In parent U.S. Pat. application, Ser. No. 753,647 now Pat. No. 3,574,891, a press having a first section generally similar to that shown in said U.S. Pat. No. 3,225,453 is arranged to discharge through a tapered conical sleeve into an extruder sleeve arrangement which is attached to the end of the press, beyond the tapered sleeve, thereby functioning to extrude essentially dry polymeric materials through a die plate. A rotating cutter cooperates with the die plate to separate the extruded material into suitable pellet form.

If a substantial amount of liquid, such as retained water, remains in the material as it discharges from a press, there is a rather violent escape of the liquid. This is due to the large drop in pressure on the heated material and resultant vaporization of the liquid which explodes through the containing mass of material. Depending upon the violence of this explosive action, which in turn depends on the amount of liquid present at discharge, quantities of fine particles ("fines") will be formed. These fines become a contaminant from the standpoint that they stick to adjacent surfaces, tend to absorb condensate, and/or degrade from prolonged contact with hot surfaces, then build up to the point where chunks of accumulated fines break loose and fall into the useful product.

SUMMARY OF THE INVENTION

In accordance with the invention, portions of which are disclosed in said parent U.S. application, Ser. No. 753,647, the polymeric material is advanced through a screw press cage provided with a substantial number of drainage or vent openings, preferably as fine slots between screen bars mounted in adjoining relation around all or portions of the cage. Within this cage a series of interrupted screw flight members are arranged on a rotatable shaft. These screw flight members are adapted to propel the material through the cage, and some or all of the screw flights may be notched or slotted to promote further working of the material as it is compressed and propelled through the cage. The screw flight members are separated by collars which are also carried on the shafts, and in the region of the collars there are breaker bars or lugs extending inwardly from the cage wall to impede the rotation of the material in the cage, and to cooperate with the screw flight to work the material as it is advanced through the cage. Preferably, the bodies of the screw flight members (or some of them) are of progressively increasing diameter, and those collars between screw flight members having different diameters are appropriately tapered to provide a smooth annular passage of decreasing volume, such that the material is compressed as it is worked and advanced through the cage.

The final or extruder section is preceded by an inwardly tapered sleeve which surrounds the final screw flight member of the main worm assembly, and cooperates therewith to direct the material into the extruder section. This section comprises one or more additional screw flights, of smaller diameter, carried on the end of the shaft, and operating within a cylindrical sleeve that extends from the end of the tapered sleeve to discharge of the press, where the die plate is mounted across the cylindrical sleeve. Preferably the interior of the cylindrical extruder sleeve and the outermost edge of the flight in the extruder section are coated with a hardened material such as Stellite, in order to provide a bearing support for the cantilever mounted shaft which is driven from the feed end of the press, and which extends through the cage and into the extruder section cylinder, essentially unsupported except for possible contact between the walls of the extruder cylinder section and the screw flights operating therein. If it is anticipated that additional shaft support will be needed along the cage, suitable bearing bushings can be added, as disclosed in U.S. Pat. No. 3,276,354.

The improvement described in this application relates to the construction and arrangement, in particular, of the final vented press section which discharges into the aforementioned tapered sleeve, immediately preceding the extruder section. In this region of the press cage, there is an outwardly tapering sleeve preceded by an adjustable annular choke member, generally of the type disclosed in said U.S. Pat. No. 3,518,936. Material conveyed through the press cage passes between this adjustable choke member and the tapered collar, and issues as a relatively thin sheet-like ribbon of material into and around the following screw flight member, which has a body of substantially smaller diameter than the large end of the tapered collar. Thus, the material is advanced into an expansion chamber where mechanical pressure on it is released, and this chamber is vented to the surrounding atmosphere of the press through the aforementioned slots in the walls of the press cage.

The screw flight in this expansion section is of considerably greater pitch, such that it takes up material and conveys it forward at a more rapid rate through the larger volume of the expansion chamber. This screw flight may be notched to promote working the material in this region, to assist the release of encapsulated moisture, vapors, etc. From this long pitch screw flight, material is advanced to a tapered screw flight which cooperates with the aforementioned tapered sleeve to guide and propel the material into the extruder cylinder section. The location and mounting of the tapered sleeve is such that it may take a certain amount of the longitudinal thrust of the advancing screw flights, and thus relieve the die plate from some of the reaction end thrust from the main worm assembly.

Material passing through the adjustable choke member is formed into a relatively thin sheet which is subjected to a super-heated condition just prior to entering the following expansion region, where the pressure on the material is substantially reduced, and moisture or vapors flash off. Thus, in this expansion region or zone there is a significant reduction in moisture content in the material, and a temperature drop as moisture flashes off. Thus cooler material is passed to the following extruder-pelletizer section. By controlling the adjustable choke, the temperature and moisture content of material in the expansion region can be controlled, thus the degree of flashing at the extruder section discharge, through the die plate, can likewise be controlled. This results in a definite reduction in the amount of fines produced at the die exit.

In one embodiment of the invention, there is a further annular choke member, which may be of the fixed variety, located substantially upstream of the adjustable choke member and the expansion chamber. This upstream choke member functions to create a certain amount of back pressure in the initial stages of the press cage, thereby causing the material to be worked effectively through all sections of the cage, promoting evaporation of the vapors in the material, or expression of liquids from the material with subsequent removal either by drainage or evaporation, thereby contributing to the overall efficiency of the machine. This upstream choke member may be followed by an expansion section of slightly greater internal volume, if desired.

The die plate preferably is mounted in a housing together with the shaft and drive for the rotatable cutter which cooperates with the exterior of the die plate. This housing is suitably hinged to one side of the main cage structure, adjacent the discharge end of the extruder cylinder section. This enables the entire sub-assembly to swing away from the cylinder section, allowing the die plate to be cleaned easily in the event that some of its apertures might be clogged. In addition, the extruder section, which incorporates a cylinder or sleeve having an essentially cylindrical inner surface and a tapered outer surface which decreases in diameter away from its outlet or discharge end. This arrangement provides a facility for quick removal of the entire extruder cylinder, in the event that it should become worn by abrasion or the like, as due to the bearing engagement against the extruder cylinder by the final extruder worm flights operating within it. This construction permits replacement of the extruder cylinder as an independent liner, and also permits easy replacement of the final screw flight members, thus minimizing the amount of down time of the machine while these parts are being replaced.

The object of this invention, therefore, is to provide a novel method and apparatus, having the features above described, for the removal of essentially all moisture, vapors, etc. from elastomeric polymeric materials, and for the subsequent production of suitable porous pellets or similar configurations from the material, all in a continuous process, and with minimum creation of fines in and around the product to minimize contamination of the product.

Other objects and advantages of the invention will be apparent from the following description, the accompanying drawings and the appended claims.

BRIEF DESCRIPTION OF THE DRAWINGS

FIG. 1 is an elevational view of a screw press machine constructed in accordance with the invention with portions broken away and a portion shown in axial cross-section;

FIG. 2 is a fragmentary end view taken from the discharge end of the machine generally along the line 2—2 of FIG. 1;

FIG. 3 is an enlarged section of the die plate;

FIG. 4 is a fragmentary section through the cage, taken generally on the line 4—4 of FIG. 1; and FIG. 5 is a fragmentary perspective view showing the cutter housing and drive pivoted to an open position.

DESCRIPTION OF THE PREFERRED EMBODIMENT

The screw press shown in FIG. 1 includes a base and frame 10 which supports a gearbox housing 12 and an upwardly projecting end support 13. The upper end of the support 13 is also rigidly connected to the housing 12 by a pair of elongated tie bolts 14. An elongated barrel or cage 15 is supported by the frame and includes a plurality of drainage sections 16, 17 and an extruder discharge section 18.

The cage sections 16 and 17 are each formed by a pair of mating semi-cylindrical parts 20 (FIG. 4) each having a plurality of axially spaced arcuate ribs 22 connected by axially extended integral flange members 23. Each pair of mating cage portions 20 is rigidly connected by a plurality of tie bolts (not shown) which extend through a series of aligned holes 24 formed within the flange members 23. The ribs 22 of the mating cage portions 20 cooperate to define a cylindrical bore 25, and a plurality of axially extending screen bars 28 (FIG. 4) line the bore 25 to define a cylindrical pressing chamber 30. The bars 28 are peripherally spaced by wedge-shaped spacers (not shown) to form narrow axially extending drainage openings or slots 31 and are retained in each cage portion 20 by axially extending retaining bars 35 (FIG. 4) having axially spaced breaker members 36 projecting radially into the pressing chamber 30.

The section 18 includes a tubular housing 38 having end bushings 39 secured to the ends of the housing 38. An imperforate sleeve 44, having a cylindrical interior and a tapered exterior, is positioned within the bushings and defines a cylindrical chamber 45 which forms an extension of the pressing chamber 30. The housing 38 is in turn mounted between end plates 40 carried on the frame support 13 and on the end of section 17. The chamber 45 does not have any drainage openings and is somewhat smaller in diameter than the pressing chamber 30. A smooth transistion is made from chamber 30 to chamber 45 by an annular sleeve 48 having a frusto-conical inner surface 49.

An inlet housing 55 is mounted on the inlet end of the cage 15 and has an inlet opening 58 which receives the material to be pressed. An elongated worm assembly 60 extends through the inlet housing 55 and the chambers 15 and 45 and includes a shaft 62 which is connected to a suitable drive motor 64 through a reduction gear train located within the gearbox housing 12.

The worm assembly 60 includes a feed worm 65 mounted to rotate with the shaft 62 and extending through the inlet housing 55 partially into the first cage section 16. Within the first cage section, mounted on shaft 62 and rotatable therewith, there is a succession of tapered collars 66 and a cylindrical collar 67, between which there are mounted worm members 70 having body portions which correspond in diameter to the larger diameter of the preceding collar, and at least some of the worm flights on the worm members are notched as indicated at 72. Breaker lugs or bars 36 extend toward the corresponding collars, between the worm flights, to resist rotation of the material with the worms as the shaft is rotated to propel the material through the cage.

Toward the far end of the section 16 there is a tapered collar 75 which includes an oppositely tapered downstream edge 76, followed by a worm member 78 having a flight of substantially greater pitch than the preceding worm flights. The body of the worm member 78 corresponds in diameter to the adjoining part of the oppositely tapered collar portion 78, thus defining an expansion chamber 80 within the downstream end of the cage section 16. Cooperating with the outwardly tapered section of collar 75 is a choke or ring member 82 which provides with the collar 75 a restricted annular orifice through which all of the material must pass in moving into the expansion chamber 80. Preferably the entire length of the cage section 16 is constructed with drainage openings between the screen bars 28, although in some instances it may be desirable to have portions of this cage section with the spacers omitted between screen bars, or an equivalent construction, to form sections from which no drainage or venting is available.

The orifice provided between the ring 82 and collar 75 functions to create a desired amount of back pressure within the upstream portions of cage section 16, thus assuring that the material is being properly worked and dewatered in this section. The material passing through the aforementioned orifices into the chamber 80 is subjected to a decrease in mechanical pressure on passing through the orifice and into the expansion chamber. This allows the liquid to vaporize at the lower pressure, due to the previous working and heating of the liquid containing material to a superheated condition. The longer pitch worm member 78 carries this material upward toward the end of the cage section 16, and around the cylindrical collar 69, assuring that there is always somewhat of a void in the expansion chamber 80 to allow the material to expand as it is being worked by the flight of the worm member 78 and promoting the venting and flashing or draining of pockets of moisture from the material.

The material is conveyed into the cage section 17, where it is picked up by the first worm member 85 and then conveyed by a succession of worm members 86, some of which may have notched flights as shown, past a first tapered collar 87, and subsequent cylindrical collars 88. Again, breaker bars 36 extend toward the collar for the same purpose as previously mentioned.

The material then passes over an oppositely tapered collar 90 and is picked up by a worm member 92 of smaller diameter operating within a movable ring or choke member 95. This ring member is movable axially of the worm assembly, toward and away from a tapered collar 96, to provide an adjustable orifice 98 through which all of the material must pass. The ring member 95 can be moved longitudinally toward and away from collar 96, by reason of its threaded connection 100 with a control gear 102 that is rotated by a pinion 103 driven from suitable reduction gears 104 and a motor (not shown) or some other source of power. Details of such an adjustable ring member are more fully described in said U.S. Pat. No. 3,518,936.

A worm member 110 follows the tapered collar 96, and may have a notched worm flight and a body of substantially less diameter, providing an expansion chamber 112 which extends past a short cylindrical collar 114 to a tapered worm member 115 that operates within the tapered collar 49 at the exit from the cage section 17. The adjustable ring member 95 provides a close control over the size of the orifice 98. The pressure exerted upon the material in this region, followed by the expansion of the material in the chamber 112 and the working of the material by the notched flights of the worm member 110, in turn provides a precise control over the amount of moisture in the material, enabling the apparatus to reduce the moisture at this point to nearly 1 percent. The resultant flashing and venting of moisture in the region of the expansion chamber 112, which is surrounded by spaced screen bars as previously described, promotes cooling of the polymeric material, and assures that the material is kept within the desired temperature limits as it is fed into the extruder section 18 with little or no moisture remaining.

Following the tapered worm member 115, the shaft carries and drives, within the sleeve 44, a first worm member 120, followed by a short cylindrical collar 122, and a second worm member 125 at the end of shaft 62, and preferably having a double helical flight near its discharge end. A breaker pin 127 is supported by a fitting 128 in the housing 38, and extends through the sleeve 44 toward the collar 122. This pin may include a thermocouple for indicating temperature of the material at this location. Preferably, the outer peripheral surfaces of the flights of worm members 120 and 125 are hard coated (as with Stellite) and ground to form a close fit with the inner cylindrical surface of the sleeve 44, thereby providing a bearing support for the discharge end of the worm assembly.

A circular die plate 130 (FIGS. 1, 3 and 5) is mounted on member 40 by a series of screws 131 and includes an annular array of nozzle orifices 134 each defined by a removable plug 135 (FIG. 3) which seats within a counterbore and extends axially to a flat annular face 136. Referring to FIG. 3, the die plate 130 includes a center plug 138 and a conical shaped cap 140 which defines a central chamber 142. A pair of radially extending passageways 143 are formed within the die plate 130 and are connected to a pipe line 145 for directing steam into the die plate 130 for heating the die plate to a predetermined temperature. The plugs 135 are interchanged with another set of plugs for changing the size of the orifices 134, and the die plate 130 may be supported by a hinge to provide for swinging the die plate open after the screws 131 are removed and thereby provide for convenient interchanging or cleaning of the plugs 135.

A housing 150 is pivotally connected to the end member 13 by a hinge (FIG. 2) which includes a pivot pin 152 projecting through aligned holes formed within interfitting ears 153 and 154 secured to the frame member 13 and housing 100 respectively. Referring to FIG. 1, the housing 100 defines a generally square discharge chamber 155 having a bottom outlet 156. A shaft 160 is rotatably supported by a bearing assembly 162 mounted on the housing 150, and the forward end portion of the shaft extends through the chamber 155 to support a rotary cutter 165 which is secured to the end of the shaft 160 by a series of screws 166 (FIG. 5). The cutter 165 includes a plurality of peripherally spaced radially extending knives 168 which are positioned in close spaced relation to the face 136 of the die plate 130 for rotation past the discharge orifices 134.

A motor 170 is mounted on the housing 150 and has an output shaft connected by a V-belt drive 172 to the rearward end portion of the shaft 160 for rotating the cutter 165. Referring to FIG. 2, the housing 150 is secured to the upright end member 13 of the frame 10 by a series of screws 174. When it is desired to remove the die plate and/or the cutter, however, the screws 174 are removed and the housing 150 is pivoted or swung to an open position as shown in FIG. 5 where the cutter is retracted from the die plate 130.

The support for the die plate 130 and the cutter 165 provides an important feature of the invention. By mounting the die plate 130 on the discharge end of the cage and by mounting the cutter 165 on the end of the motor driven shaft 160 which is supported by the pivoting housing 150, the cutter 165 can be easily and quickly moved to a retracted position (FIG. 5) where both the die plate and the cutter are conveniently accessible for removal or service. This feature is especially desirable when it is desired to interchange die plate plugs 135 to increase or decrease the size of the discharge orifices 134 or to remove the cutter 165 for sharpening the blades 168. Furthermore, by driving the screw assembly 60 from its feed end and by rotatably supporting the discharge worm 125 with the sleeve 44, it is unnecessary to extend the shaft 62 through the die plate with the result that there is no annular clearance gap through which the material might be extruded.

The pivotal connection between the housing 150 and the frame 10, provided by the hinge mounting, also provides for maintaining a precise predetermined clearance between the die plate face 136 and the knives 168 of the cutter 165 after one die plate is interchanged with another die plate of the same thickness. Furthermore, the bearing assembly 162 and motor 170 may also be mounted on ways secured to the housing 150 and be axially adjustable by a lead screw so that the clearance between the knives 168 and die plate face 136 may be adjusted during operation to compensate for thermal expansion.

A significant feature of the invention concerns the location of the adjustable ring 95 and the cooperating collar 96, providing a restricted orifice upstream of the vented expansion chamber 112. The material, which is heated by working in the preceding sections of the press, is subjected to the highest pressure in passing through this orifice, ahead of the vented expansion chamber and the discharge from the pressing section. Practically all remaining moisture in the material is removed by reason of the decreased pressure on the heated material as it is forced through this orifice into the expansion chamber. Remaining moisture is flashed off at this point and rapidly vents through the openings of the walls of the expansion chamber. The worm within the expansion chamber may be notched to work the material in this region and assure that most, if not essentially all, moisture is freed at this point. In addition, this worm has a flight of greater pitch, to carry the material through the expansion chamber at a greater rate than it is entering past the orifice. The vent openings from the expansion chamber are through the spaces between screen bars, thus all solid material is readily contained in the chamber, while liquids and gases or vapors escape.

Therefore, as the material enters the extruder section, it has been cooled by reason of the expansion and flashing off of essentially all remaining moisture within the expansion chamber. As the material is forced through the die, and cut into pellets or the like, there is little if any moisture remaining, and hence little moisture as the material is discharged from the die. This avoids any excessive explosive flashing of moisture as the material leaves the die, and has been found to reduce significantly the amount of "fines" which otherwise result when material containing substantial moisture is forced through a die and is released in an explosive manner. The subsequent reduction in fines, practically eliminating them, represents a significant advantage in the handling of the finished product, and also is a great advantage from the housekeeping or maintenance standpoint, since the fines tend to cling to all parts of the machinery, become contaminated, and to build up to the point where the apparatus must be shut down for cleaning or else this contaminated material will fall off into the product.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. In a mechanical screw press for expressing liquid from an elastomeric material and including a cage having means defining an elongated pressing section with an inlet end and a discharge end, means forming fluid vent openings extending through at least portions of said pressing section, a closed extruder section receiving the material from the discharge end of said pressing section and having a discharge opening from the cage, a rotatable screw assembly extending through said cage and including a series of longitudinally spaced spiral flights separated by collars, means for rotating said screw assembly, means for progressively compressing material within said pressing section as it moves toward said discharge end and then through said extruder section in response to rotation of said screw, and breaker bar means supported by said cage and including portions projecting into said pressing section between said flights to resist rotation of the material with said flights as the material is being compressed over said collars, the improvement comprising a ring member mounted upstream of the discharge end of said pressing section adjacent one of said collars and cooperating with said one collar to define a restricting orifice, and means forming an expansion chamber within said pressing section between said restricting orifice and said discharge end of said pressing section, said expansion chamber having fluid vent openings therein whereby the liquid content of the material is significantly reduced by flashing from the material prior to said extruder section.

2. A press as defined in claim 1, including means for varying the area of said restricting orifice to achieve optimum liquid removal and temperature reduction ahead of said extruder section.

3. A press as defined in claim 1, including a die mounted at said discharge opening of said extruder section.

4. Apparatus as defined in claim 1, including vent openings upstream of said restricting orifice for initial flashing and/or draining of liquid from the material as it is initially being worked.

5. In a mechanical screw press for expressing liquid from an elastomeric material and including a cage having means defining an elongated pressing section with an inlet end and a discharge end, means forming fluid vent openings extending through a major portion of said pressing section, a closed extruder section receiving the material from the discharge end of said pressing section and having a discharge opening from the cage, a rotatable screw assembly extending through said cage and including a series of longitudinally spaced spiral flights separated by collars, means for rotating said screw assembly, and breaker bar means supported by said cage and including portions projecting into said pressing section between said flights to resist rotation of the material with said flights as the material is being compressed over said collars; the improvement comprising an adjustable ring member mounted upstream of the discharge end of said pressing section surrounding one of said collars and cooperating with said one collar to define a restricting orifice, and means forming an expansion chamber within said pressing section between said restricting orifice and said discharge end of said pressing section, said expansion chamber having fluid vent openings therein of small cross-section to contain the material whereby the liquid content of the material is significantly reduced by flashing from the material prior to said extruder section.

* * * * *